United States Patent [19]

Wright

[11] 4,359,879
[45] Nov. 23, 1982

[54] REFRIGERATION SYSTEM AND NOVEL HEAT EXCHANGER THEREFOR

[75] Inventor: Neal A. Wright, Columbus, Ga.

[73] Assignee: Diversified Air Products, Inc., Columbus, Ga.

[21] Appl. No.: 221,912

[22] Filed: Dec. 31, 1980

[51] Int. Cl.³ .......................................... F25B 41/00
[52] U.S. Cl. ...................... 62/513; 62/434; 165/143; 165/154
[58] Field of Search .............. 62/113, 434, 513; 165/143, 154

[56] References Cited

U.S. PATENT DOCUMENTS

| | | | |
|---|---|---|---|
| 2,691,273 | 10/1954 | Kramer | 62/513 |
| 2,764,876 | 10/1956 | Parcaro | 62/513 |
| 3,643,733 | 2/1972 | Hall et al. | 165/154 |
| 3,851,494 | 12/1974 | Hess | 62/513 |

*Primary Examiner*—Ronald C. Capossela

*Attorney, Agent, or Firm*—Harvey B. Jacobson

[57] ABSTRACT

A refrigeration system for cooling and drying hot moist compressed air comprises sub-cooling the liquid refrigerant from the condenser to eliminate all flash gas and render the entire evaporator effective for refrigeration purposes. The heat exchangers for the evaporator and for sub-cooling the liquid refrigerant are of a novel construction comprising a one-piece finned copper inner cylinder with the routed fin enclosed inside of an annular copper shell in which a 0.020-inch clearance exists between the annular copper shell and the fins to allow passage of a stream of air which causes the laminar flow around the routed fin construction to be agitated by eddy diffusion. The use of the novel heat exchanger in the refrigeration system along with the step of sub-cooling the liquid refrigerant produces a gain in refrigeration effect of about 23% to 30% without an increase requirement for either power or energy.

9 Claims, 4 Drawing Figures

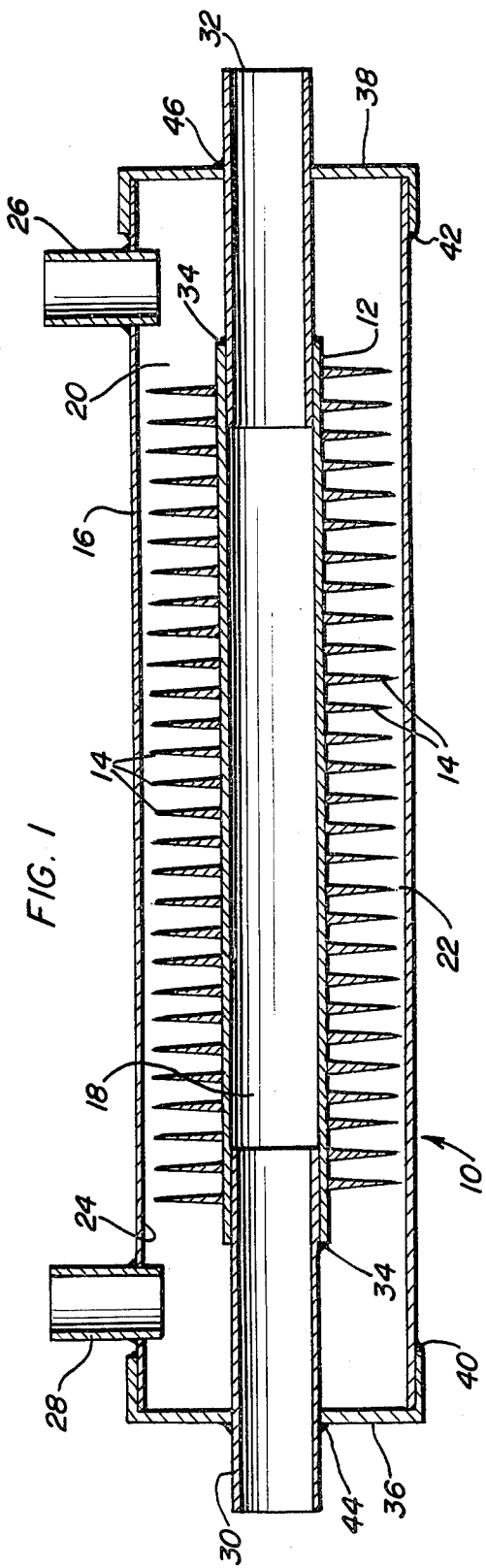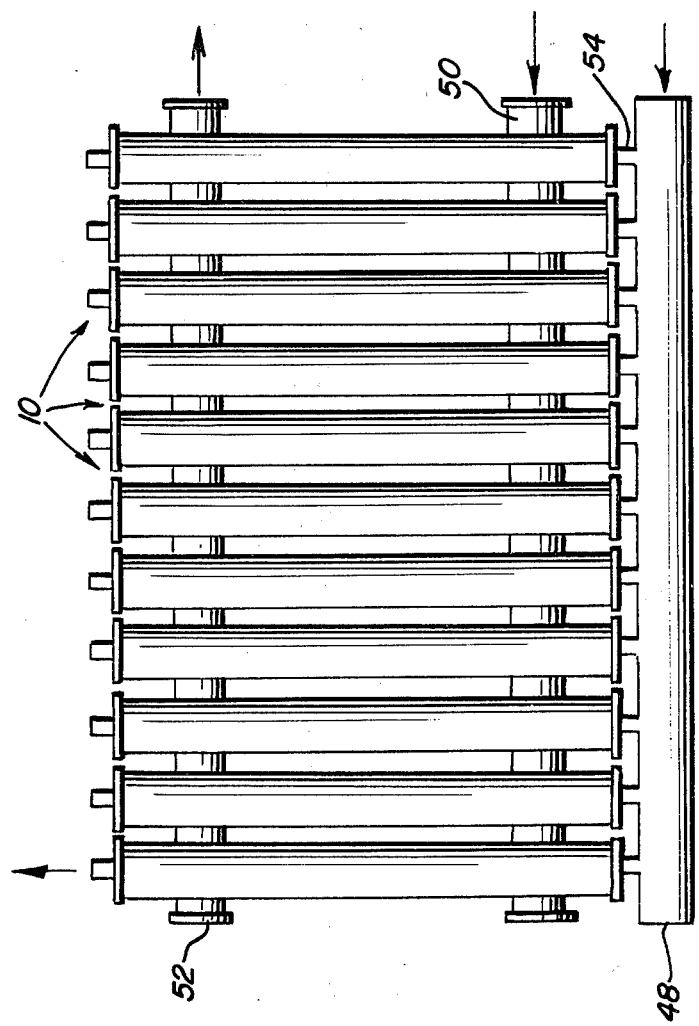

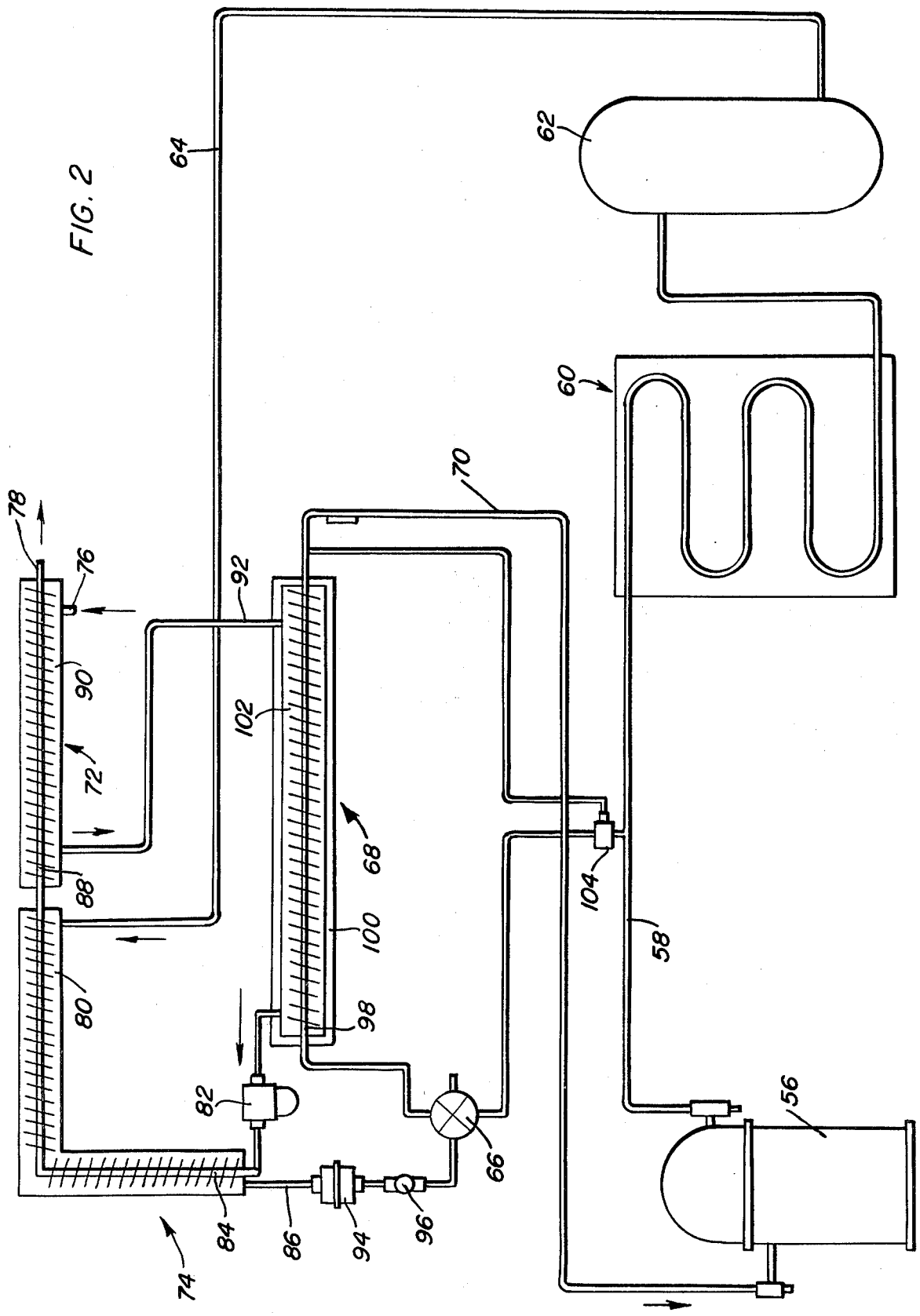

REFRIGERATION SYSTEM AND NOVEL HEAT EXCHANGER THEREFOR

FIELD OF THE INVENTION

This invention is concerned with air purification, and more particularly relates to an air dryer through which compressed or pressurized air is directed, exiting free of moisture.

Specifically, this invention relates to a refrigeration system for cooling and removing the moisture from hot, moist, compressed air by sub-cooling the liquid refrigerant before entry into the evaporator and utilizing a novel heat exchanger structure for use as the evaporator and the means by which the liquid refrigerant is sub-cooled.

DISCLOSURE STATEMENT

It is well known to provide external fins onto heat exchange surfaces to increase the heat exchange surface area and thus greatly increase heat transfer efficiency. Heat exchange fins are commonly incorporated onto heat exchange surfaces by soldering, welding or otherwise attaching separate fin structures onto the external surfaces of heat exchange cylinders. Examples of such structures can be seen in U.S. Pat. Nos. 1,833,876; 2,070,539; 1,531,777; 2,804,283; and 3,643,733. A disadvantage of these two-piece constructed heat exchangers involves the separation of the fins from the external surfaces of the heat exchange tube, thus drastically affecting the heat exchange properties. Furthermore, stresses from the attachment of the fins to the heat exchange cylinders may produce small openings through the heat exchange cylinder resulting in undesirable mixing of the fluids passing through and over the heat exchange cylinder. U.S. Pat. No. 2,463,997, issued to Rodgers, discloses forming finned tubing by forming the fins integral with a tubular blank. In each of the above patents, wherein an outer annual casing surrounds the finned heat exchange tubing, the heat exchange fins extend from the external surface of the tubing to a point in contact with the internal surface of the outer casing, allowing spiral flow of a fluid between the finned tubing and the annular casing. As will be discussed during the description of the present invention, a heat exchange structure comprising a finned inner cylinder and an outer annular casing in which a small clearance is present between the inner surface of the casing and the outer point of the fins greatly increases heat transfer efficiency. Further, other features of the novel heat exchanger of the present invention, such as the one-piece construction of the inner finned cylinder and the high tensile strength solder utilized to form the heat exchanger into a single unit, produces results greatly superior to the heat exchangers described in the above prior patents.

There have, of course, been many improvements and modifications in refrigeration systems utilizing a condenser, an evaporator, and a refrigerant compressor. However, no refrigeration system utilized for treating hot, moist air has incorporated sub-cooling of the liquid refrigerant prior to the evaporator in the manner disclosed by the present invention, nor have prior refrigeration systems incorporated the novel heat exchanger of the present invention to provide increased refrigeration effect without a corresponding increase in the amount of energy required.

SUMMARY OF THE INVENTION

It is a primary object of the present invention to produce clean, dry and cool air from hot, moist pressurized air.

It is another object of the present invention to provide a refrigeration system with increased refrigeration effect without an increase in the power or energy requirement.

It is another object of the invention to provide a refrigeration system in which the refrigerant is maintained in the liquid state in the evaporator by precooling the liquid refrigerant to eliminate all flash gas and thus render the entire evaporator effective for refrigeration.

Still yet another object of the present invention is to provide a novel heat exchanger which is designed to incease heat transfer efficiency over conventional finned tube exchangers and which is constructed so that when incorporated into conventional refrigeration systems will prevent mixing of the refrigerant and work fluid.

These objects are accomplished in accordance with the present invention by sub-cooling or precooling the liquid refrigerant from the condenser prior to expansion and the cooling of the work fluid in the evaporator. The sub-cooling of the liquid refrigerant removes all flash gas therefrom which aids in maintaining the refrigerant liquid throughout the evaporator, thus rendering the entire evaporator effective for refrigeration. The liquid refrigerant is sub-cooled by indirect heat exchange with cooled work fluid leaving the evaporator.

The refrigeration system of the present invention is particularly useful in producing clean, dry and warm air from hot, moisture saturated pressurized air. In a preferred mode of operation, inlet hot, moist air is cooled by outgoing clean, dry air before the work fluid is passed to the cooling effect evaporator.

In still another preferred form of the refrigeration system, the evaporator and the heat exchanger to precool the inlet hot, moist air preceding the evaporator are provided with manifolds which feed a plurality of heat exchangers.

All heat transfer in the refrigeration system of the present invention is accomplished by a novel heat exchanger comprising a one-piece finned copper inner cylinder enclosed inside of a annular copper shell in which a clearance of about 0.020 inch exists between the inner surface of the shell and the fins. A stream of fluid flowing within the clearance between the outer portion of the fins and the inner surface of the shell agitates by eddy diffusion the spiral flow of fluid passing along the outer surface of the spirally finned cylinder, thus increasing the transfer of heat between the fluids passing through the shell and cylinder, respectively, over what is possible with typical finned tube heat exchangers in which the outer surface of the fins contact the surface of the shell. Sealing of the entry tubes into the finned cylinder and sealing of the ends of the shell with end caps is accomplished with a 29,000 lb. tensile strength solder which assures no possible leakage and requires no diaphragm or spring assembly. Likewise, the one-piece inner finned cylinder construction with no mechanical bonding of the fins to the outer surface of the cylinder insures that no leakage of fluid, such as the refrigerant, due to weaknesses formed during the bonding of the fins will occur. Accordingly, removing all flash gas from the liquid refrigerant by sub-cooling the refrigerant prior to entry into the evaporator and by utilizing the novel heat exchanger of the present invention, a gain in refrigeration effect of 23%-30% has been realized without any increase in either power or energy requirements.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a longitudinal sectional view of the novel heat exchanger of the present invention.

FIG. 2 is a schematic diagram illustrating the refrigeration system of the present invention including sub- or precooling of the liquid refrigerant prior to evaporation.

FIG. 3 is an elevational view illustrating the manifolding of the novel heat exchangers.

DETAILED DESCRIPTION OF THE INVENTION

Figure 4:
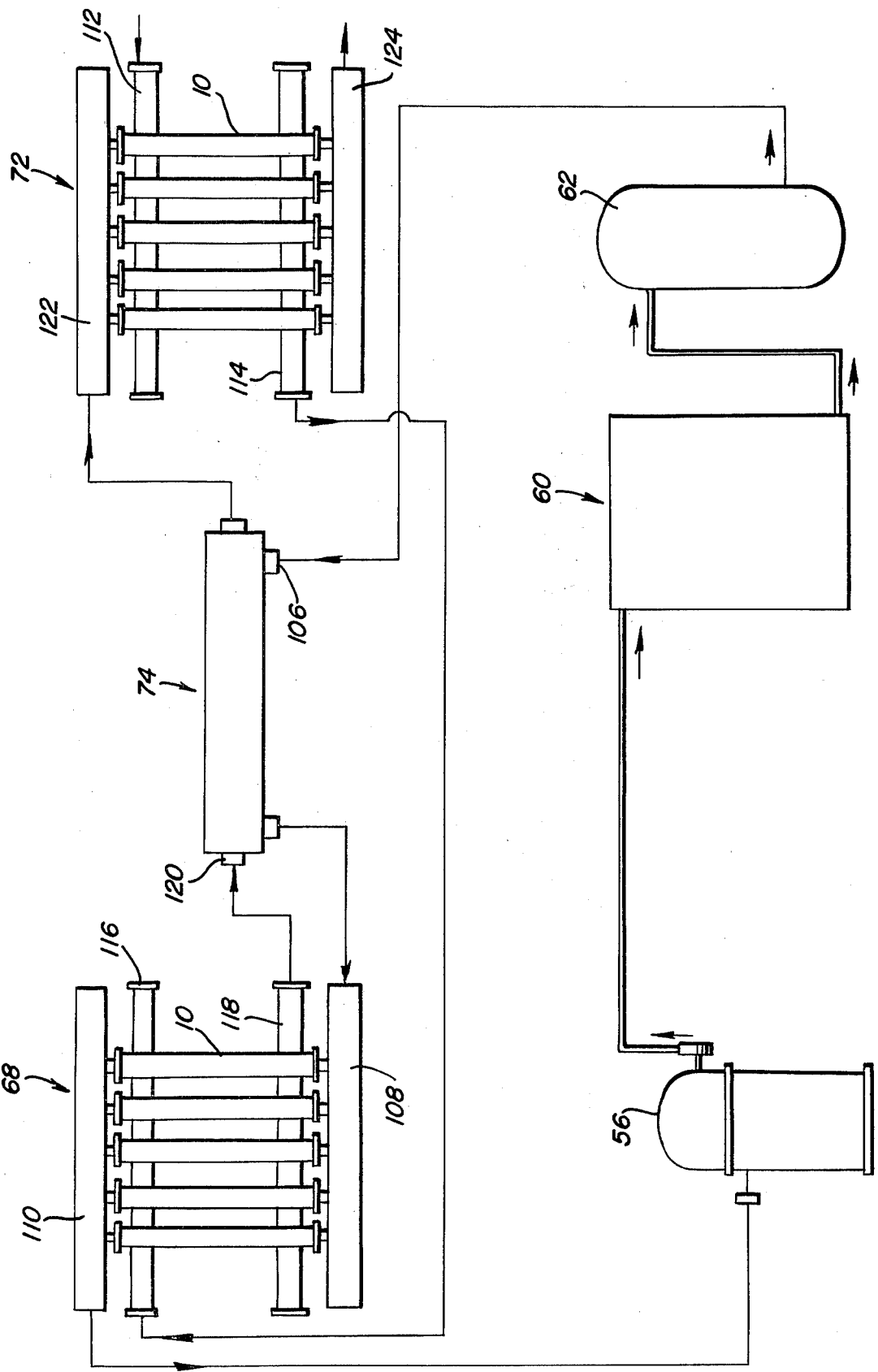
FIG. 4 is a schematic diagram of the refrigeration system of the present invention in which the evaporator and precooling of the hot, moist air is accomplished by a plurality of heat exchangers fed by a manifolding system.

The novel heat exchanger of the present invention is illustrated in FIG. 1 and indicated by reference numeral 10. Heat exchanger 10 comprises a one-piece finned copper cylinder 12 with routed fins 14 formed in a spiral substantially along the entire length of cylinder 12. Enclosing finned copper cylinder 12 is annular copper shell 16 whereby heat exchanger 10 is provided with tube side space 18 and annular shell side space 20 for heat exchange between fluids passing through the respective tube and shell spaces. An important feature of heat exchanger 10 is the small gap indicated by reference numeral 22 existing between the outer end of fins 14 and the inner surface 24 of annular copper shell 16. Clearance 22 is approximately 0.020 inch and allows a stream of fluid flowing through shell space 20 to agitate by eddy diffusion the spiral flow of fluid passing around routed fins 14. The agitated fluid flow through shell space 20 coupled with the countercurrent flow of fluid through tube side space 18 produces a heat transfer significantly more efficient than produced in heat exchangers currently in use.

Although dimensions of heat exchanger 10 may vary, preferred dimensions for use in the refrigeration system of the present invention as illustrated in FIGS. 2 and 4 are as follows. The length of annular shell 16 may vary between 9 inches or 15 inches, the length of finned area on copper tube 12 being either 6.5 inches or 12 inches, respectively. Five fins per inch of copper cylinder 12 produces a surface area of about 32 sq. in. per linear inch of copper cylider 12. As illustrated in FIG. 1, routed fins 14 decrease in thickness as the fins extend from cylinder 12 toward outer shell 16.

Other important design features of heat exchanger 10 include the perpendicular arrangement or placement of the fluid inlet and exit tubes 26 and 28, respectively, which direct the fluid in a vortex flow around the one-piece finned copper cylinder 12 in shell space 20. The construction and sealing of the component parts of heat exchanger 10 are also important in providing the greatly improved heat transfer and advantages in using heat exchanger 10 in refrigeration systems. Accordingly, entry tubes 30 and 32 are sealed to inner copper cylinder 12 at weldments 34 and outer copper shell 16 is placed about copper cylinder 12 and sealed with end caps 36 and 38 at weldments 40 and 42, respectively. Entry tubes 30 and 32 are sealed to end caps 36 and 38, respectively, by weldments 44 and 46, respectively. All sealing is accomplished by a high tensile strength solder such as a silver solder having a tensile strength of 29,000 lbs. per sq. in.

Heat exchanger 10 illustrated in FIG. 1 can be used singly to provide heat transfer or provided in a manifold system in which a plurality of the heat exchangers are aligned and placed in communication with manifolds which feed the various fluid inlets. Such a manifolding system is illustrated in FIG. 3 in which a plurality of heat exchangers 10 are shown associated with tube side manifold 48 and a pair of shell side manifolds 50 and 52. All entry tubes 54 receive fluid from manifold 48 for passage through the tube side of heat exchanger 10 while shell side manifolds 50 and 52 from the entry and exit paths, respectively, of fluid through the shell side of heat exchanger 10. Manifolds 48, 50 and 52 are preferably simple hollow cylinders or any other type of conventional manifolds and can include a distribution mechanism so that all entry ports are fed equally.

The refrigeration system of the present invention including sub- or pre-cooling of the refrigerant preceding entry into the evaporator is illustrated in FIG. 2. The refrigeration system incorporates conventional refrigeration structure including refrigerant compressor 56, hot refrigerant gas line 58, condenser and fan assembly 60, refrigerant receiver 62, liquid refrigerant line 64, expansion valve 66, evaporator 68 and suction line 70 returning refrigerant vapors to compressor 56. The refrigeration system illustrated in FIG. 2 is useful in providing clean, dry and rewarmed air from incoming hot, moisture saturated pressurized air. Evaporator 68, air precooling chamber 72 and refrigerant subcooling heat exchanger 74 are constructed in accordance with the teachings set forth for heat exchanger 10 illustrated in FIG. 1. This novel heat exchanger design along with subcooling of the liquid refrigerant in heat exchanger 74 before entering evaporator 68 produce the increased refrigeration effect realized by this invention.

A better understanding of the features and advantages of the refrigeration system can best be illustrated by describing the operation of the component parts and description of the paths of fluid flow. The refrigeration system is preferably utilized to remove the moisture from hot, moist compressed air entering precooling heat exchanger 72 at inlet 76 in which the inlet air enters at about 100° F. and 100 psig. Outgoing clean, dry and rewarmed air leaves heat exchanger 72 at outlet 78 substantially free of the moisture of incoming air and at a temperature ranging from 55°–85° F. Following the refrigerant flow path, a common refrigerant such as a chlorine substituted fluorocarbon passes from evaporator 68 through suction line 70 in the vapor state into compressor 56 wherein the refrigerant vapors are compressed and passed to condenser and fan assembly 60 where the vapors are condensed and stored in refrigerant receiver 62. Liquid refrigerant passes from receiver 62 through liquid refrigerant line 64 and into shell side 80 of heat exchanger 74. Liquid refrigerant in line 64 still contains a substantial portion of flash gas which substantially decreases the refrigeration effect which occurs during the expansion of the liquid refrigerant as it passes through the evaporator. In accordance with the teachings of the present invention, cold air leaving evaporator 68 and filtered through moisture separator 82 is passed through tube side 84 of heat exchanger 74 in countercurrent flow with the liquid refrigerant passing through shell side 80 to cool the liquid refrigerant to a temperature of about 40° F. in outlet line 86 and eliminate all flash gas from the refrigerant. Subcooled liquid refrigerant leaving heat exchanger 74 passes through filter dryer 94, sight glass 96 and into expansion valve 66 which distributes the refrigerant into tube side 98 of evaporator 68. Evaporator 68 is provided with an outer covering of insulation 100. Liquid refrigerant passing through tube side 98 flows countercurrent to the air passing through shell side 102 of evaporator 68. Liquid refrigerant entering expansion valve 66 is void of all flash gas and subcooled to a temperature of about 40° to 42° F. at the point of entering evaporator 68. Accordingly, the refrigerant remains liquid such that any gas that forms is enclosed by liquid refrigerant throughout the total extent of evaporator 68, rendering the entire evaporator effective for cooling the precooled hot air entering shell side 102 of evaporator 68. The elimination of flash gas from the liquid refrigerant prior to passage through the evaporator combined with the large surface area of the copper one-piece finned tubing of the novel heat exchanger produces the approximately 23–30% increase in refrigeration effect realized in accordance with the present invention. Leaving the evaporator, the liquid refrigerant is heated due to expansion and heat exchange with air and vaporizes and enters compressor 56 to continue the cycle while cold air from the evaporator leaving at a temperature of approximately 30° to 35° F. passes to heat exchange 74 for subcooling the liquid refrigerant. Air leaving tube side 84 of heat exchanger 74 is passed to tube side 88 of precooling heat exchanger 72 to precool the hot, moist work fluid entering shell side 90 through inlet 76, the precooled air passing to evaporator 68 through connecting line 92. Air entering tube side 88 of heat exchanger 72 is rewarmed due to heat exchange with the hot, moist incoming air. To prevent any chance of freezing conditions existing, the entire refrigeration system is controlled by a hot gas bypass valve 104 used in the conventional manner. Also, due to the construction of the individual heat exchangers, the air and refrigerant circuits are always isolated from one another, assuring air integrity and thus making the air and refrigerant circuits incorruptible with respect to internal leakage which has been a problem with other heat exchanger designs.

The refrigeration system set forth in FIG. 4 is identical to that illustrated in FIG. 2 except that evaporator 68 and precool heat exchanger 72 are manifolded such that each of the heat exchangers are supplied by a single manifold. Refrigerant subcooling heat exchanger 74, however, remains as a single heat exchange unit receiving liquid refrigerant from refrigerant receiver 62 into shell side inlet 106 wherein the refrigerant is subcooled and then passed to evaporator 68 through tube side manifold 108 which is fed by an expansion valve (not shown) equipped with a distributor which individually feeds each of the heat exchangers in the evaporator manifold. Heated refrigerant leaves cylinder 110 for return to compressor 56. Likewise, inlet hot, moist air enters shell side manifold 112 of precooling heat exchanger 72 leaving via manifold 114 into shell side manifold 116 of evaporator 68 wherein the inlet air is cooled and passed to the refrigerant subcooling heat exchange 74 from exit manifold 118. Cold air passes from evaporator 68 to the tube side inlet 120 of refrigerant subcooling heat exchanger 74 and then to tube side manifold 122 of precooling heat exchanger 72 and out from manifold 124 as clean, dry and rewarmed air.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A refrigeration system utilizing a two phase refrigerant comprising a refrigerant compressor for compressing refrigerant vapor, a refrigerant condenser in communication with the compressor for condensing the refrigerant into liquid, an evaporator in communication with the condenser through an expansion means and having a discharge in communication with the compressor, said evaporator including a work fluid flow path and a separate refrigerant flow path, and cooling heat exchanger means for cooling said liquid refrigerant from said condenser prior to the refrigerant entering the refrigerant flow path in the evaporator; said cooling heat exchanger means including a refrigerant flow path and a separate coolant fluid flow path; the coolant fluid flow path in the condenser being in flow communication with the work fluid flow path in the evaporator.

2. The refrigeration system of claim 1 wherein the separate fluid paths in said evaporator and said refrigerant cooling heat exchanger means are countercurrent to each other.

3. The refrigeration system of claim 2 including means to precool said work fluid prior to entry of said work fluid into said evaporator.

4. The refrigeration system of claim 3 wherein said means to precool said work fluid comprises a heat exchanger means comprising a pair of separate fluid paths, one of said paths for said working fluid, the other of said paths for a fluid coolant.

5. The refrigeration system of claim 4 wherein said fluid coolant path in said heat exchanger means to precool said work fluid comprises a fluid path communicating with said coolant fluid path in said means to cool said liquid refrigerant.

6. The refrigeration system of claim 5 wherein said evaporator comprises a finned inner cylinder forming said refrigerant flow path and an annular outer shell enclosing said finned cylinder forming said work fluid path, the fins on said cylinder being spaced from the inner surface of said outer shell by a distance of about 0.02 inch.

7. The refrigeration system of claim 6 wherein said liquid refrigerant cooling heat exchanger means comprises a finned inner cylinder forming said coolant fluid flow path and an annular outer shell enclosing said finned cylinder forming said refrigerant flow path from said condenser, said work fluid precooling heat exchanger means comprising a finned inner cylinder forming a flow path for said coolant fluid from said liquid refrigerant cooling heat exchanger means and an outer annular shell surrounding said finned cylinder forming a flow path for entering hot, moist work fluid.

8. The refrigeration system of claim 7 wherein said evaporator and said work fluid precooling heat exchanger means each comprise a plurality of inner finned cylinders and corresponding outer annual shells aligned in parallel and communicating with a pair of cylindrical manifolds, one pair of said manifolds communicating with the tube side fluid paths and the other pair of said manifolds communicating with the shell side fluid paths.

9. The refrigeration system of claim 8 wherein said heat exchanger means are made of copper.

* * * * *